United States Patent

Sperry

Patent Number: 5,661,507
Date of Patent: Aug. 26, 1997

[54] INKJET PRINTING MODES TO OPTIMIZE IMAGE-ELEMENT EDGES FOR BEST PRINTING QUALITY

[75] Inventor: Robert William Sperry, San Luis Obispo, Calif.

[73] Assignee: Hewlett-Packard Company, Palo Alto, Calif.

[21] Appl. No.: 195,297

[22] Filed: Feb. 10, 1994

[51] Int. Cl.$^6$ .............................. B41J 29/38; B41J 23/00
[52] U.S. Cl. ..................................... 347/9; 347/37
[58] Field of Search ................... 347/41, 40, 12, 347/9, 37

[56] References Cited

U.S. PATENT DOCUMENTS

| | | | |
|---|---|---|---|
| 4,814,886 | 3/1989 | Kuge et al. | 358/293 |
| 4,999,646 | 3/1991 | Trask | 347/41 |
| 5,369,428 | 11/1994 | Maze et al. | 347/37 |

Primary Examiner—Benjamin R. Fuller
Assistant Examiner—Thinh Nguyen

[57] ABSTRACT

Inkjet-printed images (characters or graphics) have an image-quality asymmetry, correlated with the direction of pen scanning. The invention exploits this asymmetry to improve apparent overall quality by forcing the less-perfect side of each image element to become, and be hidden in, the element interior. To achieve this effect, part of each element is printed during pen scanning in one direction and part during scanning in an opposite direction. Neither scan prints the trailing edge—that is, the edge the pen reaches last, when moving in a given direction. Instead each scan prints only the leading edge—plus the interior or part of the interior, if the image is wide enough that its interior forms an analytically separate portion. If the image is wider still, it is subdivided so that one discrete interior portion is printed in the same scan with one of the lateral edges (the leading edge in one scan direction) and an additional discrete interior portion is printed in the same scan with the other lateral edge (the leading edge in the opposite scan direction). The widths of the "leading edge" and also of top and bottom edges are defined to optimize print quality by finding the best tradeoff between oppositely acting surface-tension effects: when very wide portions are printed all at once, creating a large pool of liquid ink, objectionable "runners" occur (which effect favors defining the "edges" as narrow); but when only very narrow portions are printed, edges objectionably reveal the pixel structure conspicuously (which favors defining the "edges" as wide). Overlap dots can be included in the portion or portions printed when scanning in either or both directions, to avoid narrow unprinted gaps in case of misalignment between scans in opposite directions.

12 Claims, 9 Drawing Sheets

BAND BAND

BAND BAND

BAND BAND

BAND BAND

INKJET PRINTING MODES TO OPTIMIZE IMAGE-ELEMENT EDGES FOR BEST PRINTING QUALITY

RELATED APPLICATIONS

U.S. utility-patent application Ser. No. 08/055,660 of Gregory D. Raskin, filed on Apr. 30, 1993, and issued as U.S. Pat. No. 5,426,457 on Jun. 20, 1995, is relevant to certain aspects of the present invention as will be explained hereunder, and is hereby incorporated in its entirety into the present document.

BACKGROUND

1. Field of the Invention

This invention relates generally to inkjet printing systems in which an image (characters or graphics, or both) is constructed on a printing medium as an array of many individually computer-controlled inkdrops; and more particularly to a method for printing such an array which minimizes undesired artifacts that arise in the inkjet printing process.

2. Related Art

An inkjet image can be created through any one of myriad different inkjet nozzle firing patterns, implemented by specific program steps of a microprocessor. Such program steps are usually provided in the form of firmware for a general-purpose programmable microprocessor, but fixed arrays of electronic logic elements can be used instead.

Any such firing pattern is called a "print mode". Print-mode variations encompass special uses of a pen or different portions of a pen in coordination with choice of printing-medium advance distance or frequency, special suppressions of firing for specified nozzles, and special choices of nozzle timing (as, for example, during scanning in different directions).

Many different print modes are used to accomplish many different purposes. Such objectives include, for instance, high speed, or more accurate hue for specific printing media, or subtle reduction of the total amount of liquid ink present on a piece of print medium at one time, or (as in the Raskin patent document mentioned above) better alignment of forward and return scans in bidirectional printing, or masking of subtle printing defects—such as arise, for example, from cyclical variations or other imperfections in print-medium advance distance, or from isolated nonfiring nozzles, or from internozzle variations in ink volume.

It is believed that heretofore all print modes known in the art have been devised on the implicit assumption that inkdrops, and (with respect to print quality) assemblages of inkdrops, are symmetrical. Thus it has been taken for granted that a drop deposited on a printing medium by a pen while scanning in one direction (for instance, from left to right) looks the same as a drop deposited by the same pen while scanning in the opposite direction (such as from right to left).

Accordingly it has been implicitly assumed that inkdrop arrays deposited during scanning in different directions look the same—or, to put it in still another way, that image quality at both sides of a drop, or both sides of an assemblage of drops, is the same. If this were true, both sides of every image element would be equally good, or equally bad, so (given mutual alignment of image portions deposited during opposite-direction scans) it wouldn't matter which way the pen moved while printing different parts of each image element.

It has been pointed out, however, that these implicit assumptions are false, or in other words that inkdrops or at least assemblages of them do indeed have good sides and bad sides. Careful inspection and study of inkjet-printed images reveals an image-quality asymmetry, correlated with the direction of pen scanning.

Specifically, each distinct image element is cleaner on the side from which the pen moves toward that element than it is on the side toward which the pen moves from the same element. This difference appears to be due to a tendency of minute amounts of extremely fine spray, associated with firing of the pen, to overshoot the target position very slightly.

Sometimes workers in this field refer to such spray as the "tail" of the inkdrop or as a "secondary dot". In any event it presents the appearance of a slight blurring, irregularity or dirtiness of the associated trailing part of what has been printed.

Evidently this spray, tail or secondary dot results at least in part from lower average speed of fine particles in the direction normal to the printing medium, and therefore longer transit time between the nozzle and the medium. Such lower average speed may result from the processes that generate the spray, or possibly the effectively greater air damping for small particles, or both.

(Even though damping force decreases with area, the effect of such drag is greater for small particles because mass and therefore momentum decrease with volume. Another possible contributor to offsetting of the spray is downwind drift of fine particles in the wake of the pen carriage. It will be understood that the utility of the present invention, to be described shortly, does not rest on the accuracy of any of these speculations.)

After conventional bidirectional printing, the blurring effect is present at both sides of each image element, and so the original asymmetry of print quality for each element is concealed. After conventional unidirectional printing, the blur is present at only one side.

Earlier thinking addressed to mitigating this print-quality defect may have concentrated on cocking or angling each nozzle to somehow align the tail or secondary dot with the main or primary dot. In any event in commercial practice this defect or at least part of it remains.

Still other known print-quality defects have not been satisfactorily addressed in configuring print modes. In particular it is known that, when very wide continuous image areas are printed all at once, creating a large pool of liquid ink, undesired so-called "wicking" and "runners" occur; these are visible small streams of ink, representing paths of ink movement by capillarity through fibers of the printing medium and away from the area where the ink has been deposited.

Heretofore print modes have addressed overinking problems either by (1) subtlely suppressing the total amount of ink on a printed image, or (2) allowing more drying time by dividing each image segment into checker-board-like sub-groupings for printing in successive pen scans, the division being arbitrary—that is, without regard for the particular pattern or characteristics of image elements being printed. Both these techniques are ingenious, and they do ameliorate other overinking problems (such as offsetting, and adhesion of adjacent sheets) on which the present discussion does not focus, as well as misalignment between adjacent pen swaths; yet these techniques do have drawbacks.

Suppressing the total amount of ink has some at least slight adverse effects on hue accuracy and color saturation.

More importantly—since such ink reduction is willy-nilly, i. e. not correlated, with respect to image characteristics—overall ink suppression may unduly starve some image areas that actually are not subject to wicking.

Dividing image segments for printing in three or more successive scans has the disadvantage of increasing the required printing time. It may do so needlessly in image areas free of wicking and runners.

As noted above, wicking is most serious for broad expanses of continuous inking. On the other hand, when only very narrow portions are printed, edges objectionably reveal the pixel structure conspicuously as a distinct scalloped or serrated pattern, because surface tension is inadequate to pull the ink pool into a more-nearly straight border.

Earlier print modes have not effectively addressed this problem. As will be apparent it tends—whenever present—to be exacerbated by the overall ink-suppression or multiscan image divisions discussed above.

Another known print-quality impairment relevant to the present invention, and to other bidirectional printing systems, is misalignment between scans in opposite directions. This problem is manifested as a narrow line of unprinted or background color (for example white) where adjacent pixel blocks, printed in opposite-direction scans, fail to merge visually into a single apparent image element.

The aforementioned Raskin patent document offers one valuable solution to such problems, though it depends for its full effectiveness upon good consistency of motor speeds in the reverse or retrace direction. That solution can evidently avoid narrow unprinted gaps where blocks of pixels laid down in opposite directions fail to be spaced properly at the regular pixel periodicity.

It may not, however, cure a gap in which failure to visually merge results from inadequate wicking between the two blocks, due to one being already dry. A simpler solution to interscan misalignments, and one which may help to avoid this particular problem, could be useful.

Heretofore these considerations have not been taken into account in devising print modes for best print quality. Thus important aspects of the technology used in the field of the invention are amenable to useful refinement.

SUMMARY OF THE DISCLOSURE

Part of the creative contribution of the present invention resides in the recognition that, since the implicit assumption of drop symmetry described above are in fact false, an additional degree of freedom is available for optimization of print quality. In fact print quality is subject to refinement and enhancement through print modes based on correcting that assumption; the present invention introduces such refinement.

Before offering a relatively rigorous discussion of the present invention, some informal orientation will be provided here. It is to be understood that these first comments are not intended as a statement of the invention. They are simply in the nature of insights that will be helpful in comprehending the principles upon which the invention is based.

The invention exploits the above-described asymmetry to improve apparent overall quality by forcing the less-perfect side of each image element to become, and to be hidden within, the interior of that image element. To achieve this effect, certain strategically selected parts of each element are printed during scanning of the pen in one direction and certain other parts during scanning in an opposite direction.

Neither scan prints the trailing edge—that is, the edge the pen reaches last, when moving in a particular direction. Printing the trailing edge, as in conventional print modes, would allow the above-mentioned fine spray to be projected beyond that edge into what should be a background (for example, white) area free of the color being printed—thereby generating a very slightly dirty or blurry edge.

Instead each scan prints only the leading edge—plus the interior or part of the interior, if the image is wide enough that its interior forms an analytically separate portion. If the image is wider still, it is subdivided and the subparts associated, for printing purposes, with the leading edges respectively.

Thus one discrete interior portion is printed in the same scan with one of the lateral edges (the leading edge in one scan direction). An additional discrete interior portion is printed in the same scan with the other of the lateral edges (the leading edge in the opposite scan direction).

In any event, during scanning in a first direction much of the previously mentioned fine spray that arises from printing of the leading edge and interior portion is deposited within the area that should be the trailing edge—and this area is filled in solidly at the beginning of the scan in a second or opposite direction, for which the area under discussion is a leading edge. Complementarily the fine spray from that scan is deposited within the area that is filled in solidly at the beginning of the first-direction scan.

In short a large fraction of the fine spray is hidden within a solid field of ink of the same color. Such spray from the first-occurring scan is buried in a later solid edge formed in the second-occurring scan; and such spray from the second-occurring scan is imperceptible because it overprints the solid edge formed in the first.

This discussion suggests that the width of a "leading edge" preferably is great enough to encompass all or most of the overshoot or drift distance of the spray. Attempting to thus capture all the spray, however, may be counterproductive in forcing use of leading-edge width to be larger than desirable with respect to other criteria.

In particular, the width of a "leading edge" is best defined to optimize print quality by concealing most of the fine spray and also finding the best tradeoff between two oppositely acting surface-tension effects mentioned earlier:

Objectionable wicking or runners appear when very wide portions are printed all at once, creating a large pool of liquid ink. This effect tends to favor defining the "edges" as narrow.

Objectionable scalloped or serrated patterns appear when only very narrow portions are printed. This effect favors defining the "edges" as wide.

Overlap dots can be included in the portion printed in either or both directions. Such dots avoid narrow unprinted gaps in case of misalignment between scans in opposite directions—and also in case of inadequate wicking to help merge adjacent blocks printed in different scans.

Now with these preliminary observations in mind this discussion will proceed to a perhaps more-formal summary. The present invention has at least three main facets or aspects, which are amenable to practice independently of each other—although for best enjoyment of the benefits of the invention they are preferably used together.

In preferred embodiments of all of these three major aspects, the present invention is a method of printing images as an array of many pixels, using a bidirectionally scanning inkjet pen.

In a first of the three main aspects or facets, the method includes the step of—while scanning the pen in a first direction—printing the leading edge of an image element and refraining from printing the trailing edge of that element.

The phrase "the leading edge" means the leading edge with respect to that first direction. More specifically yet, the leading edge "with respect to" a given scan direction is the edge which the moving pen reaches first when traveling in that direction (here, the stated "first direction").

The method also includes the step of—while scanning the pen in a second direction opposite to the first direction—printing the leading edge of the same image element and refraining from printing the trailing edge of that element. Here "the leading edge" means the leading edge with respect to the second direction, which is to say the edge which the pen reaches first when traveling in the second direction.

The foregoing may be a description or definition of the first major facet of the present invention in its broadest or most general terms. Even in such general or broad forms, however, as can now be seen the first facet of the invention refines and enhances the art of inkjet printing.

In particular this new print mode tends to significantly enhance the image quality by concealing fine spray within the interior of each image element.

Although the invention thus provides very significant advances relative to the prior art, nevertheless for greatest enjoyment of the benefits of the invention it is preferably practiced in conjunction with certain other features or characteristics which enhance its benefits. For example, it is preferred that the method further include the step of—while scanning the pen in the first direction—also printing at least one interior portion of the same image element.

When the interior of an image element is large enough to be subdivided, preferably the interior portion is separated from the leading edge printed while scanning the pen in the first direction, and is substantially adjacent to the leading edge printed while scanning the pen in the second direction. This separation has the beneficial effect of avoiding the printing of overwide edges, and thereby avoiding generation of runners, mentioned earlier. In addition the method further includes the step of, while scanning the pen in the second direction, also printing at least one additional interior portion of the same image element. This additional interior portion is separated (for the same reason as just stated with respect to the first direction) from the leading edge printed while scanning the pen in the second direction, and is substantially adjacent to the leading edge printed while scanning the pen in the first direction.

In such cases it is preferable too that the method include the step of—before printing either leading edge—analyzing the image element. Such analysis is used to determine which pixel columns are leading edges with respect to each scanning direction, which pixel columns are the first-mentioned interior portion, and which pixel columns are the additional interior portion.

As suggested earlier the invention forces the trailing edge of each image element to become, and to be hidden within, the interior of that element. In abstract or philosophical effect each image element is folded inward upon itself to protect the viewer from relatively poorer-quality edges, like the rolled rough edges of a sheet-metal part that are hidden by a solid portion of the same part. As a practical matter, however, it may be more meaningful to say that each image element is strategically subdivided into subelements, and each of these subelements is printed in a way that is subject to the intrinsic asymmetry of print quality, and therefore is subject to print-quality defects—but the subelements are reassembled to form the starting, desired image element in such a way that solid portions of the subelements hide the defects.

I have found that further significant image enhancement can be achieved by preferably also including a step of—before printing either leading edge—analyzing the image element to determine too which pixel rows are top edge, bottom edge, and vertically middle segment of each image element. In a related step, these top and bottom edge rows, above and below the previously mentioned "additional interior" portion, are associated with the leading edge and first-mentioned interior portion printed in the first direction, for printing during scanning in the first direction; and the top and bottom edge rows, above and below the first-mentioned interior portion, are associated with the leading edge and additional interior portion printed in the second direction, for printing during scanning in the second direction.

In these preferred cases it is further preferable that the analyzing steps further include selecting the number of pixel columns to serve as leading edges in such a way as to optimize print quality; and also selecting the number of pixel rows to serve as top and bottom edges in such a way as to optimize print quality. More specifically the analyzing step preferably includes selecting the number of pixel columns to serve as leading edges in such a way as to obtain an optimum tradeoff between adverse effects of runners and adverse effects of surface tension.

Methods in accordance with the first aspect of the invention preferably include performing the image-element analysis for all elements in the image—that is to say, before printing an image, analyzing the entire image to determine which pixel columns are leading edges of image elements within the image, with respect to each scanning direction.

In preferred embodiments of a second of its main facets or aspects the method of the invention includes the steps of:

while scanning the pen from left to right, printing the left edge of an image element and refraining from printing the right edge of that element; and while scanning the pen from right to left, printing the right edge of the same image element and refraining from printing the left edge of that element.

In preferred embodiments of a third of its main facets the method includes the step of analyzing an image element to determine which pixel rows should be treated as the top edge, bottom edge, and vertically middle part, respectively, of the element; and to determine which pixel columns should be treated as the left and right edges, and first and second interior portions, respectively, of the element.

In this third facet the analyzing step includes selecting the number of rows to treat as top and bottom edges in such a way as to optimize image quality. The method also includes the steps of:

while scanning the pen in one direction, printing the top and bottom edges above and below the first interior portion; and while scanning the pen in a second, opposite, direction, printing the top and bottom edges above and below the second interior portion.

All of the foregoing operational principles and advantages of the present invention will be more fully appreciated upon consideration of the following detailed description, with reference to the appended drawings, of which:

DETAILED DESCRIPTION OF THE PREFERRED EMBODIMENTS

1. Trailing and Leading Edges

As used in this document, the terms leading edge and trailing edge are determined by the scan direction of the printer carriage. "Leading edge" designates the first edge of the vertical line printed, and "trailing edge" refers to the last edge printed.

Figure 1:
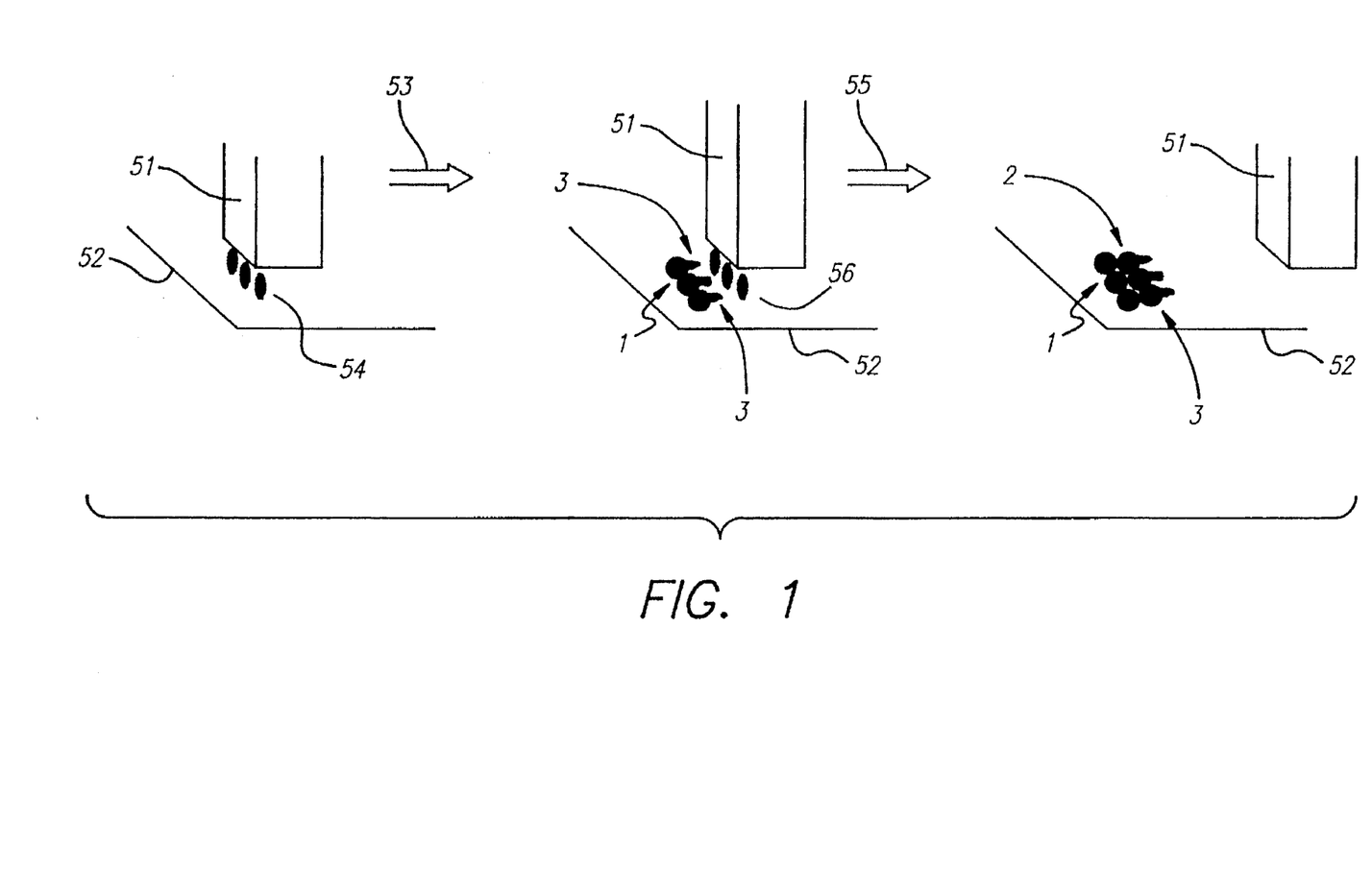
FIG. 1 is a very schematic diagram showing in isometric or perspective view what is meant by "leading edge" and "trailing edge" in an inkjet printing context for pen movement from left to right.

FIG. 1 shows in three successive subviews the printing of a vertical line 1, 2 two pixels wide onto a sheet 52 of paper or other printing medium, when the pen 51 is scanning 53, 55 from left to right, and identifies the associated leading edge 1 and trailing edge 2. In the first (left-hand) subview, during its rightward scanning motion 53 the pen 51 ejects a first column of inkdrops 54.

In the second (center) subview those drops are seen to have formed on the print-medium sheet 52 a column 1 of pixels—this will be the so-called "leading edge" of the finished line. To the right of each dot in the first column 1 there has been drawn, in this second subview of FIG. 1, a narrow rightward protuberance or extension 3.

This tail-like extension 3 symbolizes the so-called "secondary dot" mentioned earlier, and will be discussed in some detail shortly. Also in this second subview, the pen 51, while continuing to move 55 in the same direction, is seen to be ejecting a second column of drops 56.

In the third (right-hand) subview the pen 51 has completed its scan, and the second column of drops is seen to have formed on the sheet 52 another column 2 of pixels—the so-called "trailing edge" of the finished line. Here the leading edge 1 is the left side of the line and the trailing edge 2 is the right side.

In this view the protrusions from the first column 1 of dots, however, are no longer visible: they have been buried in the more massive ink deposit of the second column 2. Each of the dots 2 in the second column, however, has been drawn with a rightward tail-like protrusion 3 similar to those of the first column.

Thus no matter how many pixel columns are aggregated in this fashion the rightmost column is accompanied by a column of secondary dots that are visible. A more accurate, photographic representation of this disturbance appears in FIG. 3, which demonstrates a typical difference between the leading- and trailing-edge quality of a printed line.

Figure 3:
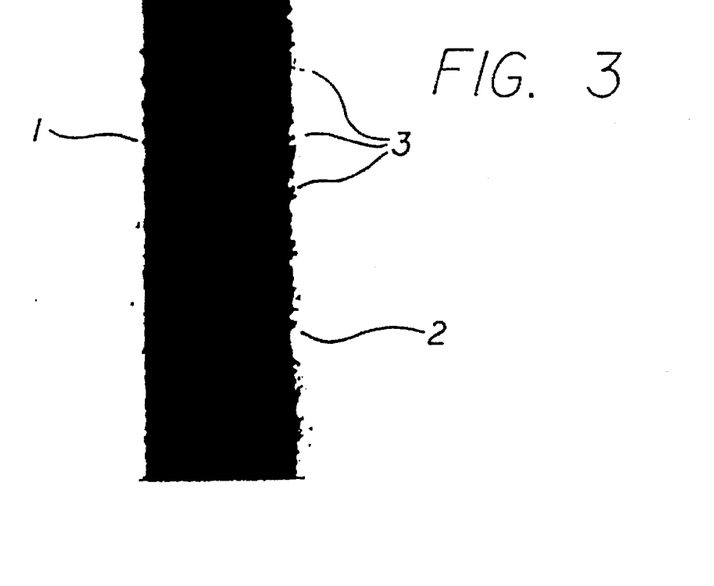
FIG. 3 is a reproduction of a photographic record, greatly enlarged, of a narrow vertical line printed on an inkjet printer.

As seen in FIG. 3, the leading edge 1 more closely approximates a straight line. The sharpness of the trailing edge 2 is irregular 3 due both to edge roughness and to increased amount of spray; the overall result is that the print quality of the leading edge 1 is superior to that of the trailing edge 2.

Figure 2:
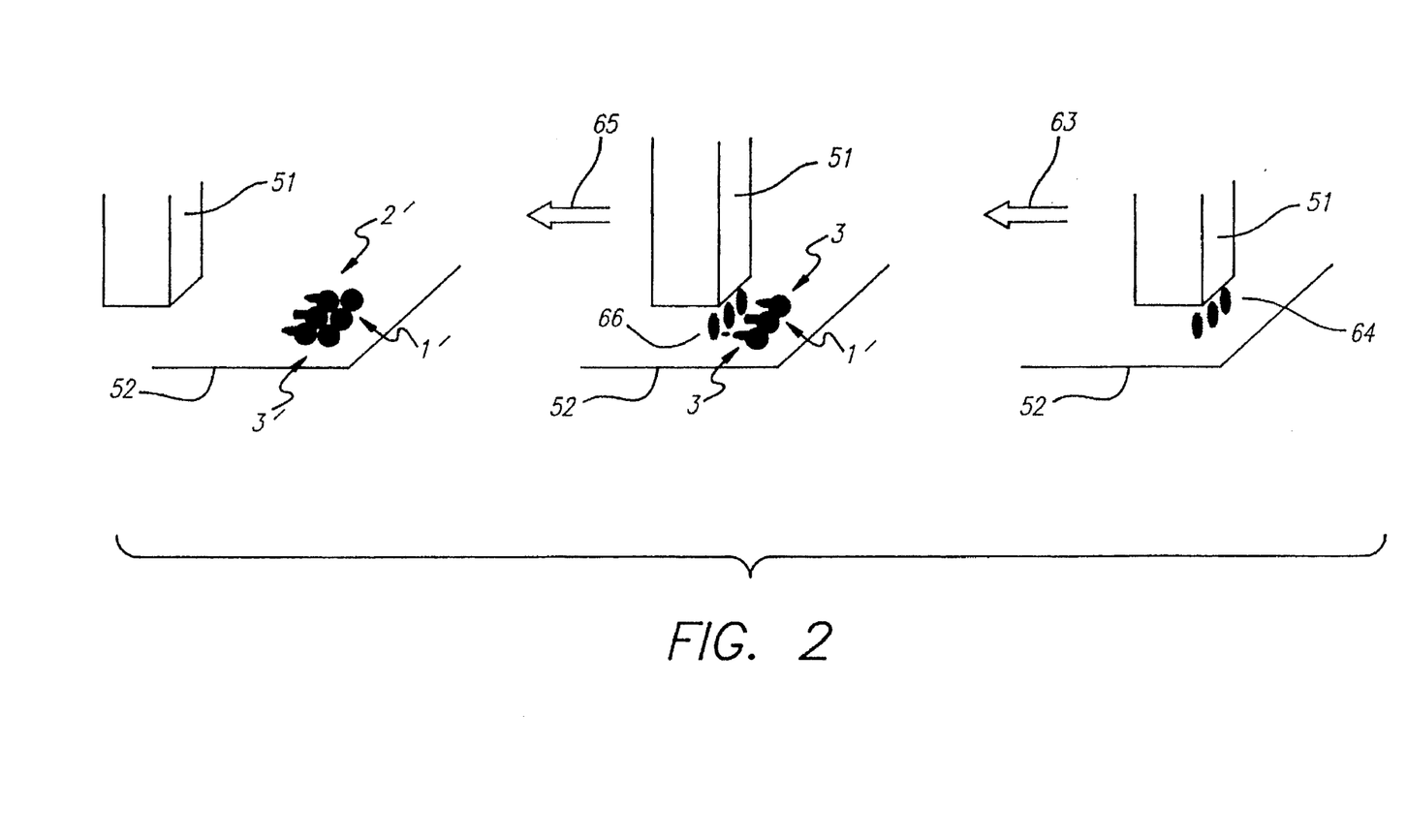
FIG. 2 is a like view for pen movement from right to left.

FIG. 2 shows phenomena analogous to those of FIG. 1, for printing of a like line 1', 2' when the pen 51 is moving 63 from right to left. The first subview (in this case the right-hand subview) portrays the pen 51 moving 63 leftward and ejecting a first column 64 of drops.

These drops in the second (central) subview are seen to have formed on the sheet 52 a first column 1' of pixels—the "leading edge" in this leftward scan—together with an associated column 3' of secondary dots, which in this case are leftward from the column 1' of primary dots rather than rightward as in FIG. 1.

The second subview also shows a second column 66 of drops being ejected while the pen 51 continues its leftward scan 65. The third subview in FIG. 2 shows the resulting two-pixel-wide line on the sheet 52 after the pen 51 has completed its scan—namely, the leading edge 1' on the right and trailing edge 2' on the left.

Once again the first column of secondary dots has been buried in the second column 2' of primary dots, but in this third subview a new array of secondary dots 3' has been created—still leftward from the associated primary pixel column 2'. FIGS. 1 and 2 demonstrate that:

- the leading edge 1, 1' can be at either the right or left side of the printed vertical line, depending on the direction 53/55, 63/65 respectively in which the pen 51 moves; and
- an irregularity, symbolized in these drawings by the tail-like secondary dots 3, 3', always appears at the trailing edge 2, 2' of any unidirectionally printed inkjet image.

It can be appreciated from this presentation that like irregularities 3, 3' appear as well at both edges of any inkjet image printed bidirectionally, if such an image is printed using a conventional print mode known heretofore.

It will be understood that these drawings are only examples. Analogous identifications of leading and trailing edges can be established for systems in which pen scanning occurs along axes other than the horizontal—whether vertical or oriented at arbitrary angles.

Since leading edges 1 are superior to trailing edges 2, it is desirable that all vertical edges printed be leading. This can be accomplished by using a bidirectional print mode as described below for a like two-pixel-wide line.

Figure 4:
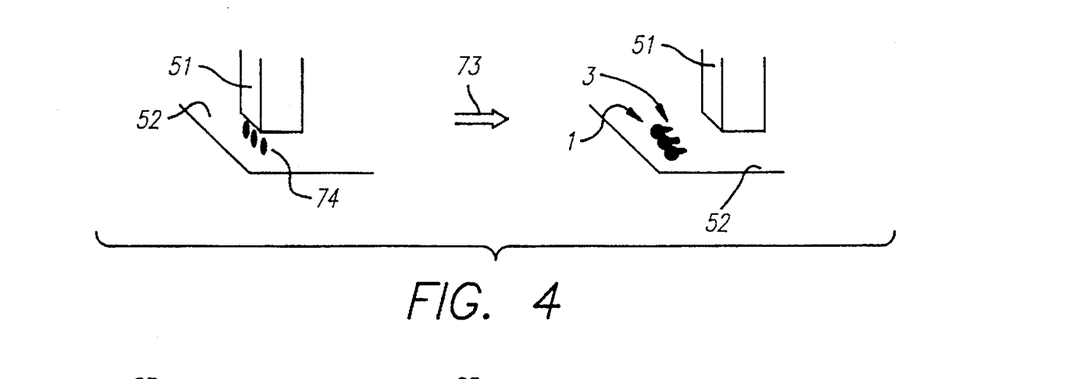
FIG. 4 is a view like FIGS. 1 and 2 showing one step of a print-mode method according to the present invention.

As the pen carriage moves 73 from left to right (FIG. 4), the pen 51 ejects inkdrops 74 to create a first column 1 of dots (pixels), which will constitute a leading edge of the finished line. In FIG. 4 as in FIGS. 1 and 2, the roughness on the trailing side of this pixel column 1 has been incorporated into the illustration, symbolized by a rightward extension or elongation 3, corresponding to the irregularities 3 of FIG. 3.

Figure 5:
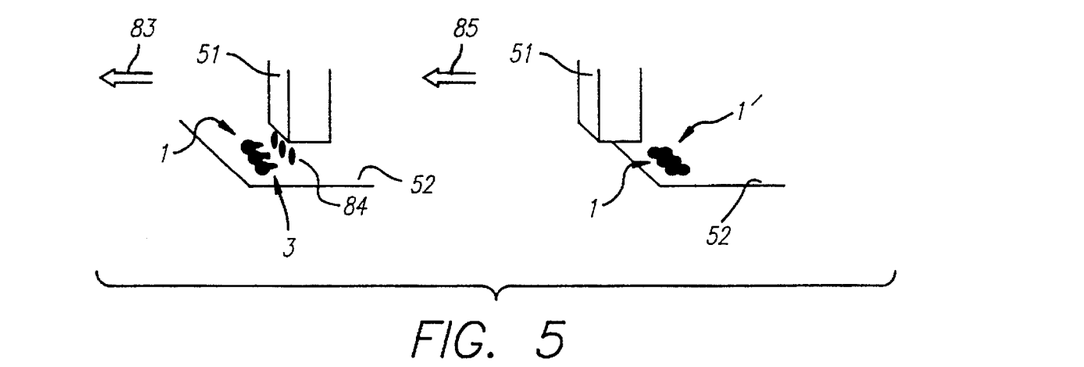
FIG. 5 is a like view showing a later step of the same print-mode method.

The direction of pen-carriage scanning is then reversed (FIG. 5). While the pen scans leftward it ejects a second column 84 of drops to make a second column 1' of dots on the sheet 52.

Thus both edges 1, 1' of the resulting vertical line are leading edges. The second column 1' of dots, however, now buries the secondary dots 3 associated with the first column 1 of dots—and the secondary dots 3' created in the process of generating the second column 1' overprints the first column 1 of like-color dots.

As a result of this strategic superposition, neither column of secondary dots can be seen. This advantageous result will obtain regardless of the number of adjacent columns aggregated, provided only that one or two dot columns along each edge are printed while the pen scans into the aggregation of columns from the adjacent unprinted or background area.

(In some extreme cases the irregularity or secondary-dot phenomenon may extend over more than one pixel width. For such cases, for vertical lines more than three columns wide, it is desirable that the dots printed as the "leading edge" consist of two pixel columns rather than just one.)

2. Line Width

The quality of a vertical-line edge depends on the line thickness, or width—the number of dot/pixel columns that make up the line. In a vertical line 13 (FIG. 6) only one dot wide, there is often not enough ink for the surface tension to smooth out the vertical edges; therefore these exhibit a marked scalloping effect 4, a series of pronounced inward-pointing cusps.

Figure 6:
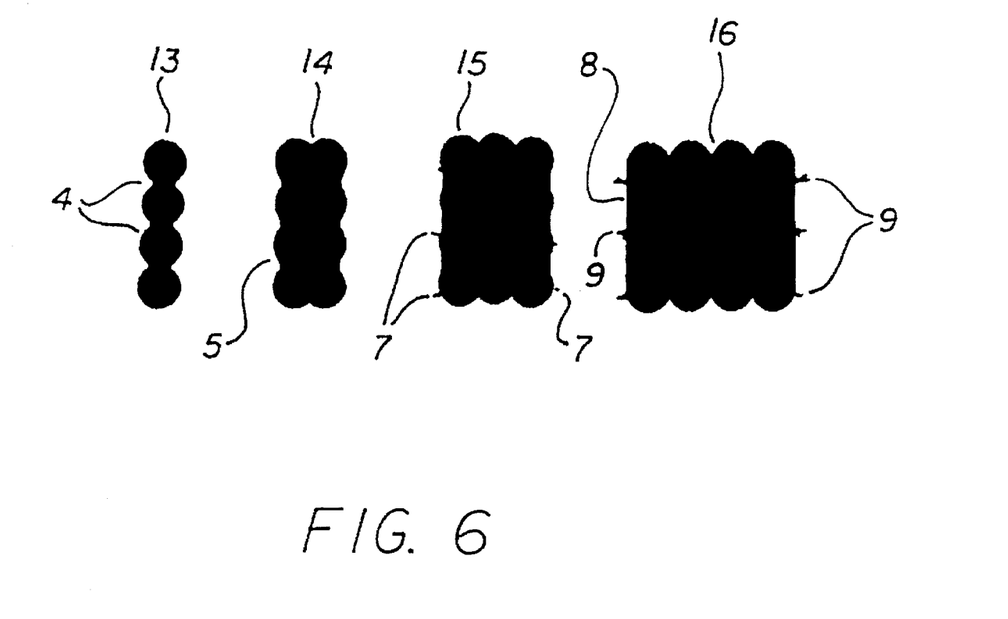
FIG. 6 is an idealized illustration of a relationship between line thickness and edge quality—showing in particular the effects of surface-tension smoothing and runners.

As more ink is laid down—for instance in a two-column-wide line 14—the vertical edges 5 become somewhat smoother but perhaps not entirely straight. As the width of the line continues to grow, perhaps to a three-column line 15, the vertical edges may be much more nearly straight, but another effect becomes noticeable:

The amount of ink laid down begins to be excessive, and the extra ink starts to move by capillarity—or "wick"—into the paper fibers, causing visible runners 7 to extend or "feather" outward from the edges. The extent of both edge smoothness and feathering 7 depends strongly on the ink formulation and type of printing medium in use; however, as a general matter while the number of columns solidly printed continues to increase (as exemplified at 16 in FIG. 6) eventually the edges 8 become quite straight but the number and length of runners 9 worsen severely.

Figure 7:
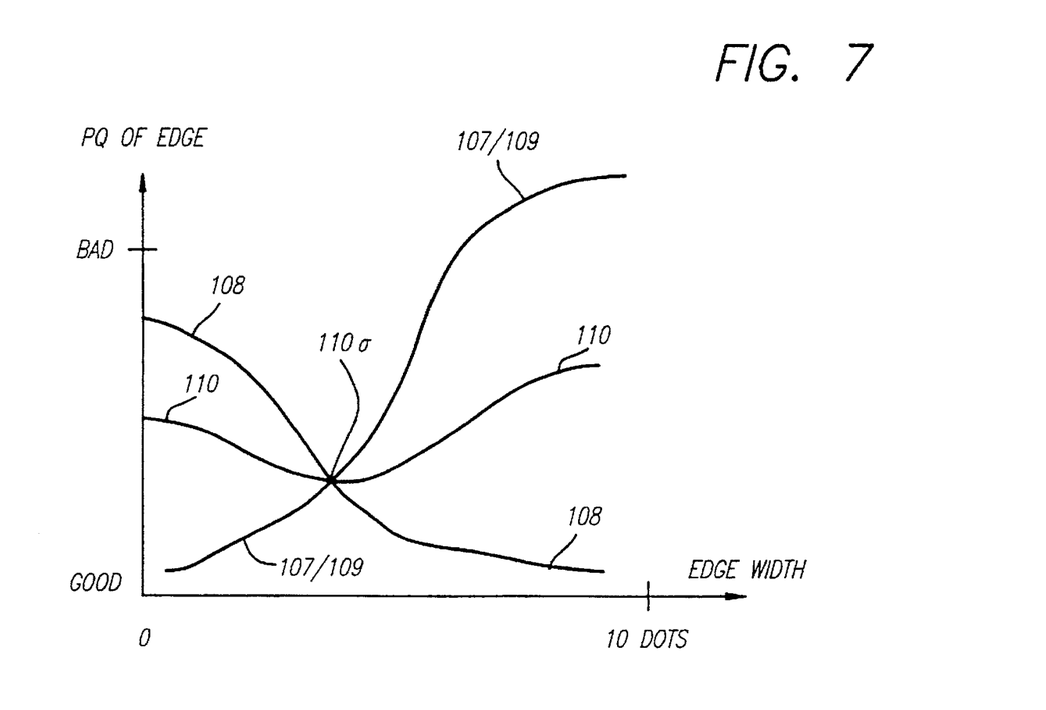
FIG. 7 is a diagram of the same relationship in a somewhat more quantified form.

To integrate these observations, the important trends observed with increase of the number of pixel columns are (1) edge smoothing 8 and (2) feathering 7, 9. FIG. 7 shows how the two trends can be optimized in a quasi quantitative sense.

In FIG. 7 the PQ ("print quality") scale from "good" to "bad" quantifies on a common, standardized basis the visual perception of both runners 107/109 and surface-tension smoothing 108, using as a PQ measure the areal deviation per unit length of line. The areal deviation is the printed area that extends beyond a smoothed, average-position edge (in this case rectilinear). Thus an ideal or "good" edge has PQ=0 (as it too, for this case, is rectilinear). The PQ sum or aggregate 110 goes through a minimum, which is an optimum point 110 for the particular combination of printing medium and ink formulation in use.

Figure 8:
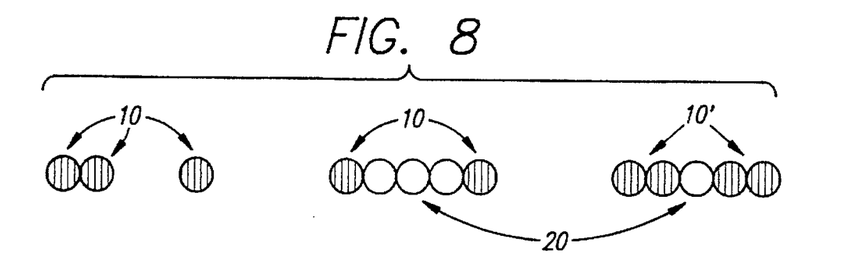
FIG. 8 is a schematic representation of simplified pixel-wise division of a horizontal line into outside edges and a single interior portion in accordance with the present invention.

With respect to horizontal lines, a further distinction is useful: the distinction is between the boundary 10, 10' (FIG. 8) and interior 20 of the line. The boundary of a horizontal line is, or boundaries are, the first and last dot segments 10, 10' that compose the line.

For optimal results either or each boundary may consist of two or more dots. For instance two dots are shown as making up only the left-hand portion of the boundary 10 in the first subview of FIG. 8, but both left- and right-hand portions of the boundary 10' in the third subview.

Figure 9:
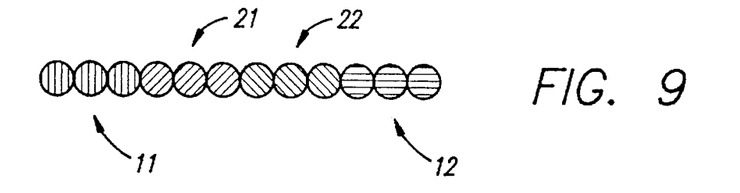
FIG. 9 is a like representation of simplified division of a horizontal line into outside edges and two interior portions, also in accordance with the invention.

One can divide the horizontal line even further into a right-side component and a left-side one. This results in four sections (FIG. 9) for each horizontal line: left end or edge 11, right edge 12, left interior portion 21 and right interior portion 22.

3. Integration of Leading-Edge, Optimum-Width and Element-Subdivision Concepts

Integration of the above concepts results in an optimized print mode. The three concepts to be integrated are:

two-pass, bidirectional, leading-edge-only printing;

optimal line width; and the four horizontal-line subdivisions.

To print an image element (a representation of an object, an alphanumeric character, etc.) in a two-pass mode requires dividing the element into two main components, one to be printed on each pass, such that when the two components are together on the printing medium the original image element appears. A further criterion for this print mode is that, when possible, both the right and left boundary thicknesses are optimized.

Figure 10:
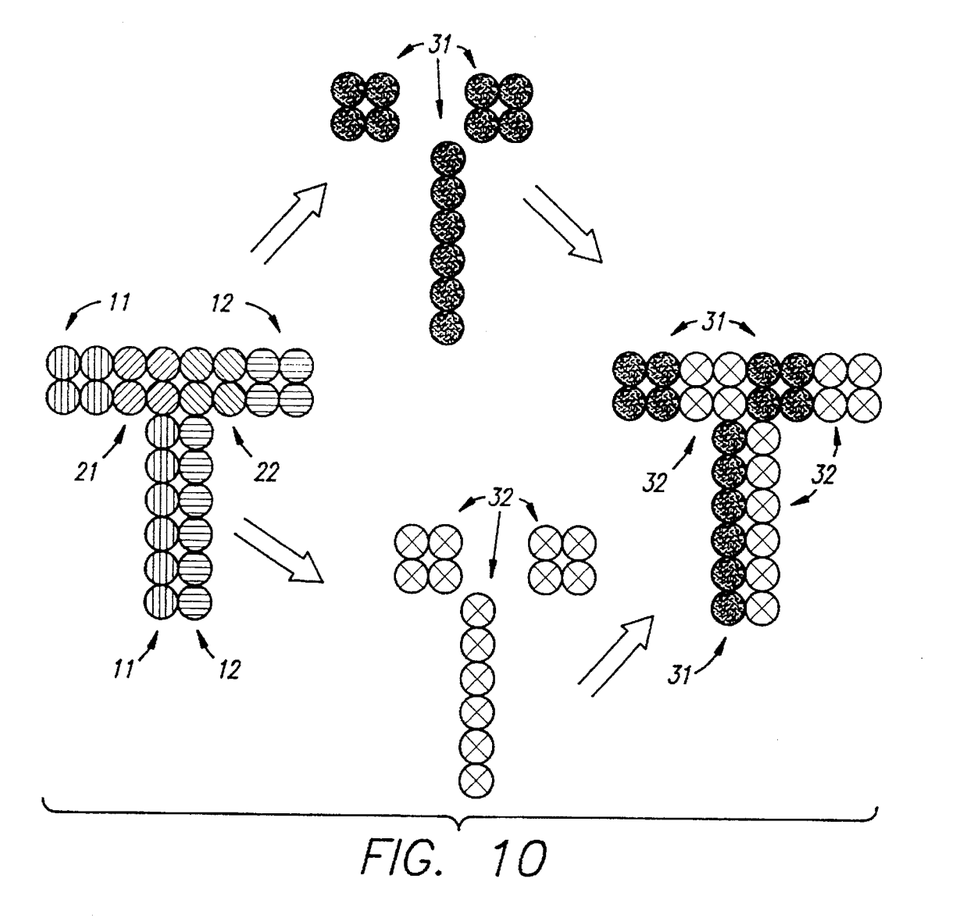
FIG. 10 is a like representation of a two-dimensional image element printed in two passes, using the FIG. 9 division.

To construct of the two main components, the interior of the image element is divided into two portions and each portion paired with its opposite boundary. For example a left inside portion 21 (FIG. 10) is part of the same main component as—and is printed in the same pass 31 with—the right boundary or edge 12; and the right inside portion 22 is part of the same main component as, and printed in the same pass 32 with, the left edge 11. In FIG. 10 all of the stippled dots 31 make up the material printed in one pass (for instance a first pass), and all of the "X"-filled dots 32 make up the material printed in another pass (for instance a second pass).

As will be seen shortly, FIG. 10 represents a simplified special case of applying a more general algorithm; the illustrated print mode is the simplest expression of the three concepts listed at the beginning of this section. A root understanding is that print quality is dependent on the order and method by which dots are placed on the page.

4. Overlap Pixels, and Vertical Divisions

To further refine the optimization, one can find the optimal boundary thickness for both horizontal and vertical lines. This suggests that even a narrow (e.g., one-pixel wide) vertical line should be split into three parts—top 41 (FIG. 11), bottom 42, and vertically middle 43.

In this part of the process it should not be assumed that the same thickness is optimal for both directions. Directionality of paper grain, for instance, could have an influence on the extent of surface-tension effects.

Figures 11, 12:
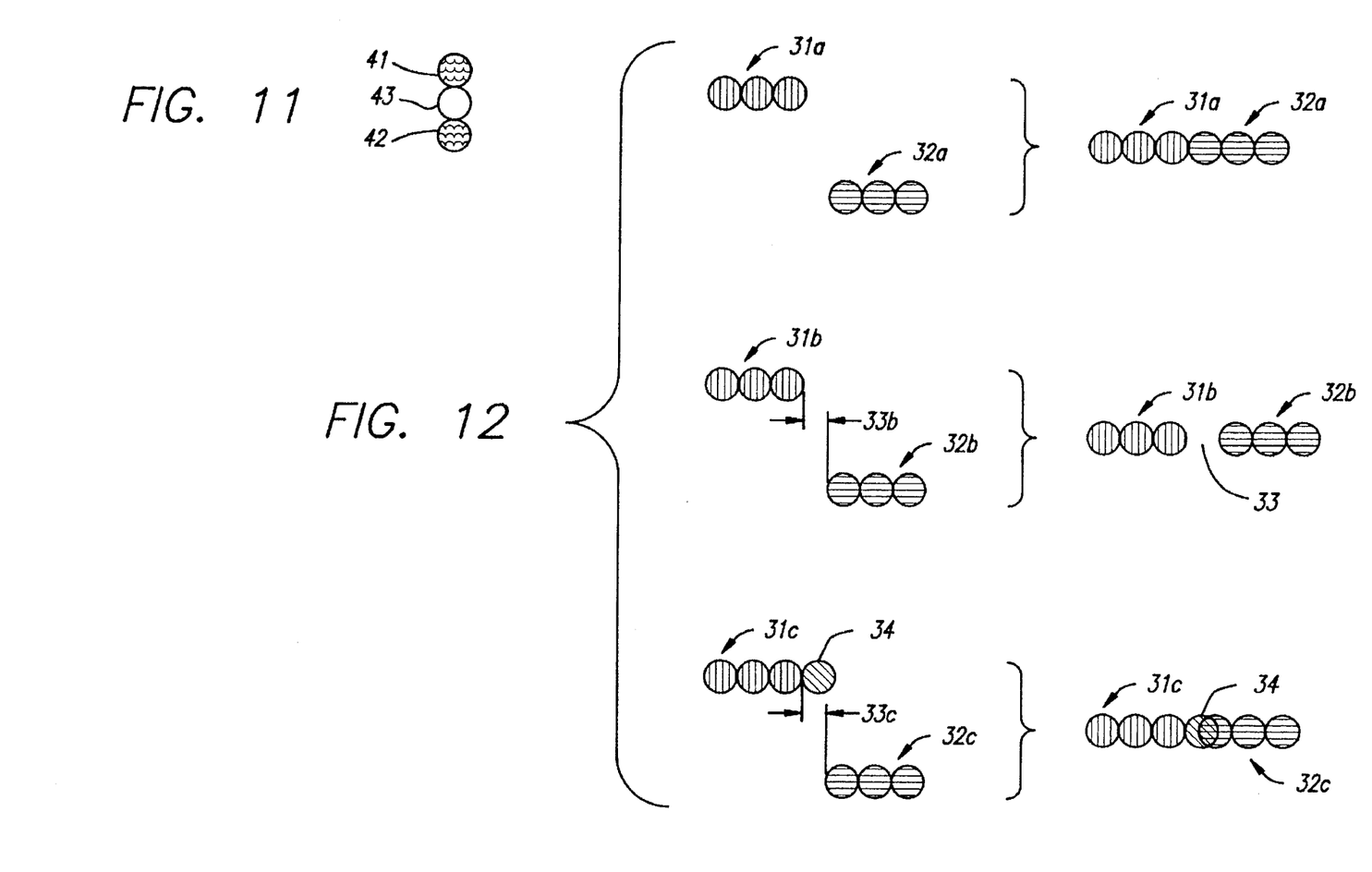
FIG. 11 is a like representation of simplified division of a vertical line into top, bottom and vertically middle portions.
FIG. 12 is a like representation of the use of an overlap dot to prevent image defects due to interscan misalignments.

When two dot groups 31a, 32a (FIG. 12) placed by pen scans in two opposite directions, respectively, are mutually well aligned, the groups are spaced apart horizontally by the same spacing as pixel columns within each group. The result, as in the right side of the first (top) subview of FIG. 12, is that the groups 31a, 32a merge to look like a continuous horizontal line—or, in a taller image element (e. g., wide vertical line), a continuous field.

In case of imperfections in dot-placement accuracy of the printing system, particularly interscan misalignments as between opposite-direction pen scans, another refinement may be needed. One effect of such misalignment can be a small displacement 33b between the groups of dots, as seen at left in the second (center) subview of FIG. 12.

Such misalignment results (right side of second subview) in interruption of the finished composite image element by a narrow white (or other background-color) gap 33—or vertical stripe 33, for a taller image element. For elements just two pixels wide (not shown in FIG. 12) the only solution may be to improve interscan tolerances.

One particularly effective way of doing so is set forth in the previously mentioned Gregory D. Raskin co-pending patent document, incorporated by reference into this document. The Raskin technique can be used for the case of wider lines as well, and for both cases should substantially eliminate the objectionable stripe 33.

For wider lines, however, another solution is to guarantee overlap of adjoining segments as by providing an additional overlap dot 34 (third subview in FIG. 12). As will be understood by people skilled in this field, this technique should be used in such a way as to accommodate relative misalignments in either direction, and may result in substantial extra ink usage—particularly for narrow image elements.

5. Overall Technique

All of the provisions described above can be combined in a single print mode. This process results in a new algorithm for dividing each image element into two components printed in two passes respectively.

An eight-by-seven image element or block 100 (FIG. 13) is used for a demonstration. For this example, the optimal line width is arbitrarily taken as two pixels horizontally and two pixels vertically.

Figure 13:
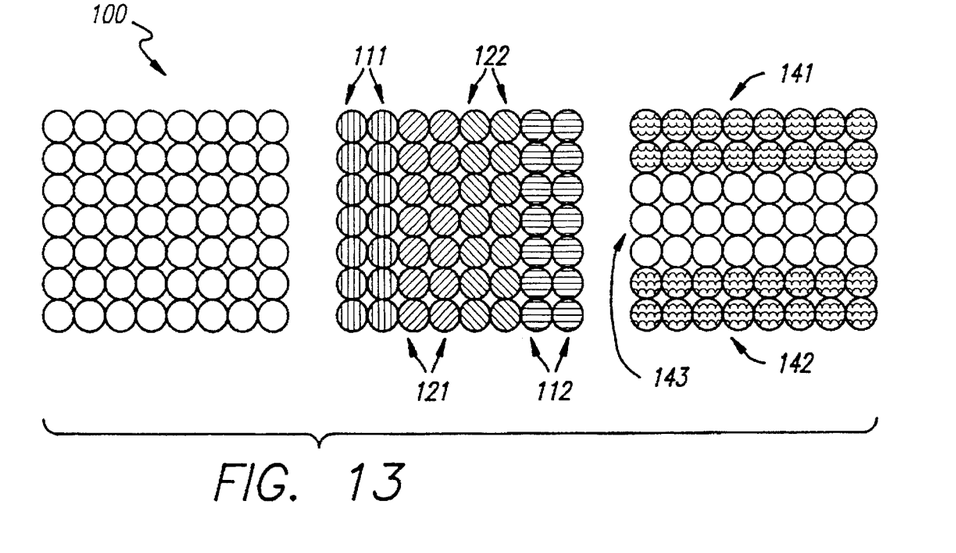
FIG. 13 is a view like FIG. 10 but showing preliminarily how the simplified horizontal-division method of FIG. 9 is integrated with the simplified vertical-division method of FIG. 11, in printing a single image element.

Preliminarily, the microprocessor firmware must analyze an image that is to be printed, to determine whether any such distinct image element or block 100 exists within the image—and, if so, to determine its boundaries. Such dissection requires scanning the overall image or parts of it for groupings of pixel columns or rows in excess of the optimal widths or heights, respectively, of edges.

In principle this image-element identifying or sensing step may be performed to completion for the entire image before printing of any part of the image (or of any image-element block) begins, or may be performed for an entire image element before printing of any part of that element begins. Still another possibility is to perform the analysis on a progressive basis in which block-sensing continues while printing proceeds.

The selection of one of these three basic approaches, or any other, should be made on the basis of tradeoffs between considerations including throughput (that is to say, overall printing speed) on the one hand, and memory capacity and firmware simplicity on the other. In any case the dissection or identification step preferably should stay ahead of the printing step by at least the number of pixel rows that is used as the optimal edge height.

Next, two pieces of information are associated with each dot that makes up the eight-by-seven block 100— a horizontal-portion label: outside right 112 (FIG. 13, central section), inside left 121, etc.; and a vertical-portion label: top 141 (FIG. 13, third section), bottom 142, or vertically middle 143.

This allocational step too may be performed on a whole-image, image-element, or progressive basis.

Figure 14:
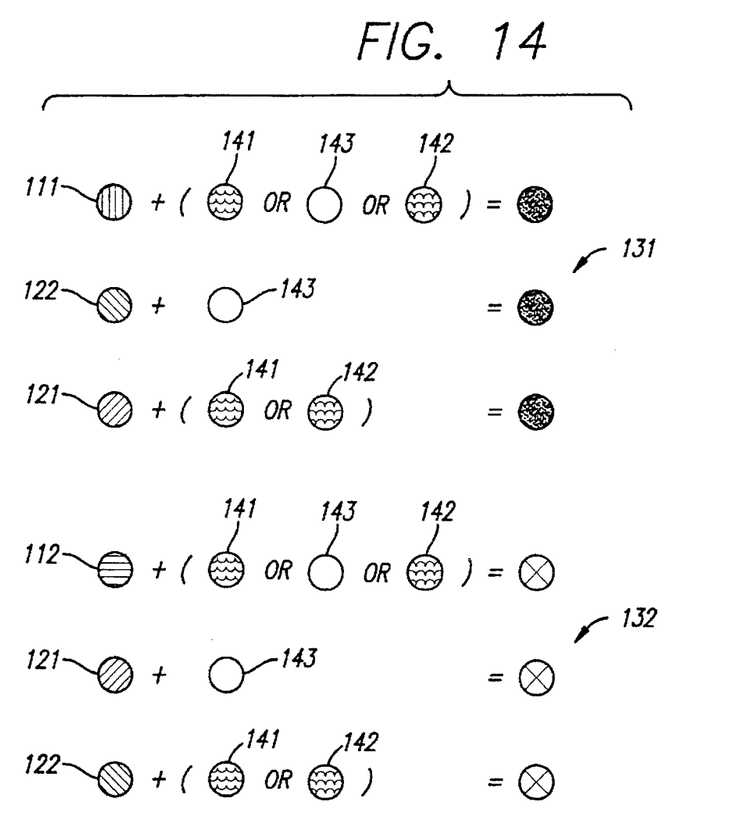
FIG. 14 is a related view showing an algorithm for operating on the FIG. 13 blocks.

Then a simple algorithm is applied, using these two pieces of information to decide which dots should be printed in a first pass 131 (stippled dots, FIG. 14) and which in a second 132 ("X"-filled dots). The result of applying that algorithm to the blocks shown in FIG. 13 is shown in a first section, "Step 1", of FIG. 15; in principle either pass 131, 132 could be first and either could be second, but for definiteness one group of dots (stippled, 131) will be taken as first.

Figure 15:
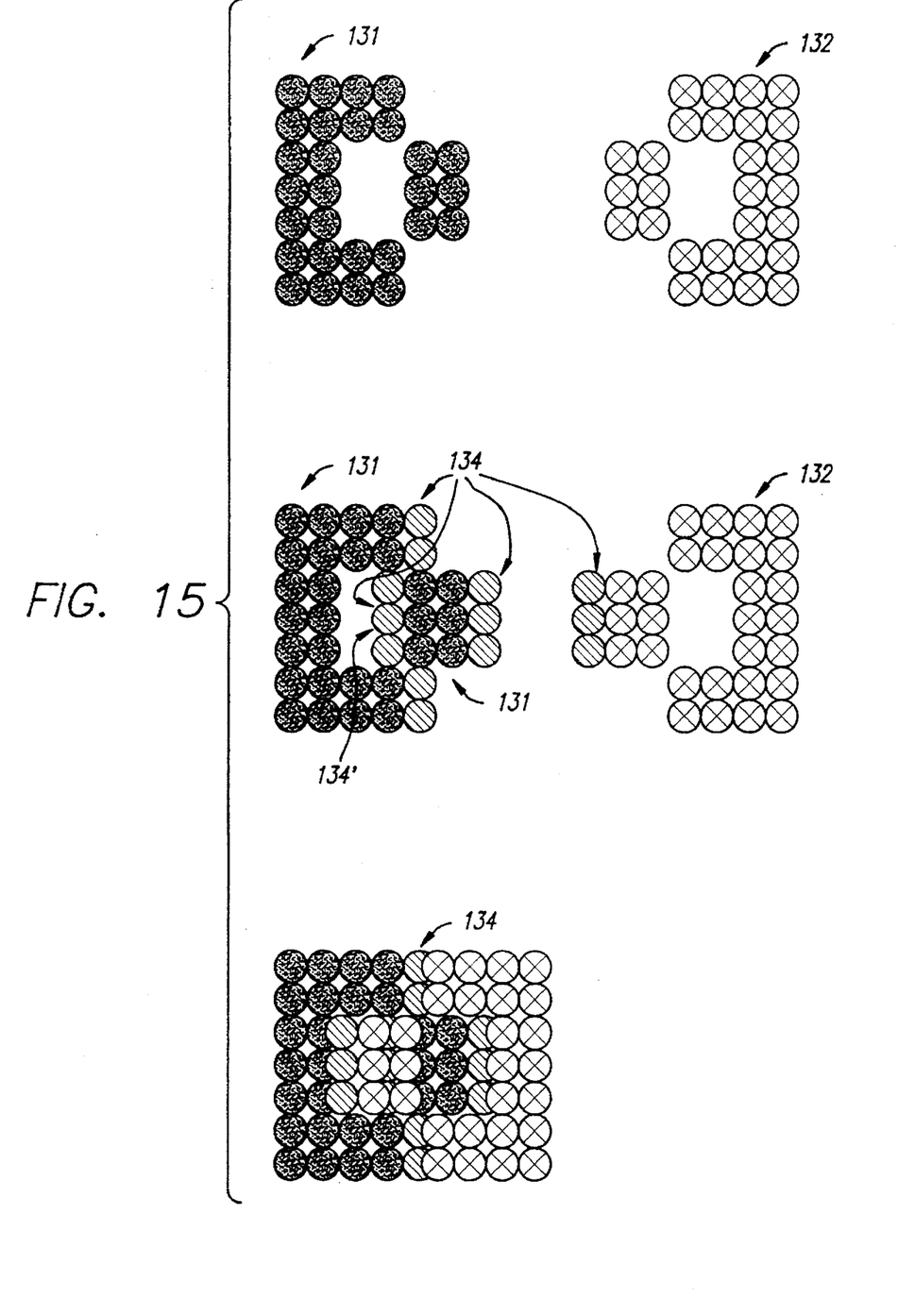
FIG. 15 is a three-step progressive view like FIG. 10 but showing how the integrated but preliminary scheme of FIGS. 13 and 14 is carried on to complete implementation.

One possible method of dot overlap is incorporated in the second section, "Step 2", of FIG. 15. Additional dots 134, 134' (downward-angled hatching) required for overlap are positioned along each of the interfaces between the two components 131, 132.

As shown, the overlap dots 134, 134' may be placed along interior left edges or interior right edges, or some of each. In particular, for example, one group of overlap dots 134' is shown along the inward-facing left interior edge of the right-middle part of the first-pass dot block 131—that is to say, an edge that faces toward other dots of the same first-pass dot block 131.

The remainder of the overlap dots, still only as an example, are all shown along outward-facing edges—that is to say, edges that face toward dots laid down in the opposite-direction pass. A depleted dot-overlap profile may be sufficient to mask undesired gaps.

The third section, "Step 3", of FIG. 15 is the result of juxtaposing the two components of "Step 2", assuming an interscan alignment or placement error of about two-thirds of a pixel row. More specifically, the second-pass component 132 is drawn misplaced or displaced to the right relative to the first-pass component 131.

This "Step 3" drawing has been assembled so that where overlap occurs the second-pass component 132—together with those of the overlap dots that are drawn in "Step 2" associated with the second-pass component 132—is on top of the first-pass component 131 and its associated overlap dots.

Thus the previously discussed inward-facing dot row 134' of "Step 2" does not come into play, being completely covered by the two pixel columns of the inside-left block that is part of the second-pass group 132. That inward-facing dot row would actually be used only if the second-pass component 132 were displaced to the left.

As can be seen from the "Step 3" composite—particularly near the left edge of the array—if the leading edges were defined as only one column wide (or if the line or image element were only two pixel columns wide) the spray or secondary dots due to the overlap dots 134 could project beyond the array boundary, once again degrading print quality. Hence the overlap-dot technique may be inappropriate for such cases.

Inspection of "Step 3" also reveals that some overlap dots (those printed in the second pass 132) partly over-print dots that form the image proper (dots printed in the first pass); whereas other overlap dots (those printed in the first pass 131) partly underlie the image proper (dots printed in the second pass). In terms of resulting appearance this distinction is without consequence.

In this overall print mode of FIG. 15, all edges printed are leading edges, each boundary is of optimal thickness, and there is minimal possibility of gaps.

Figure 16:
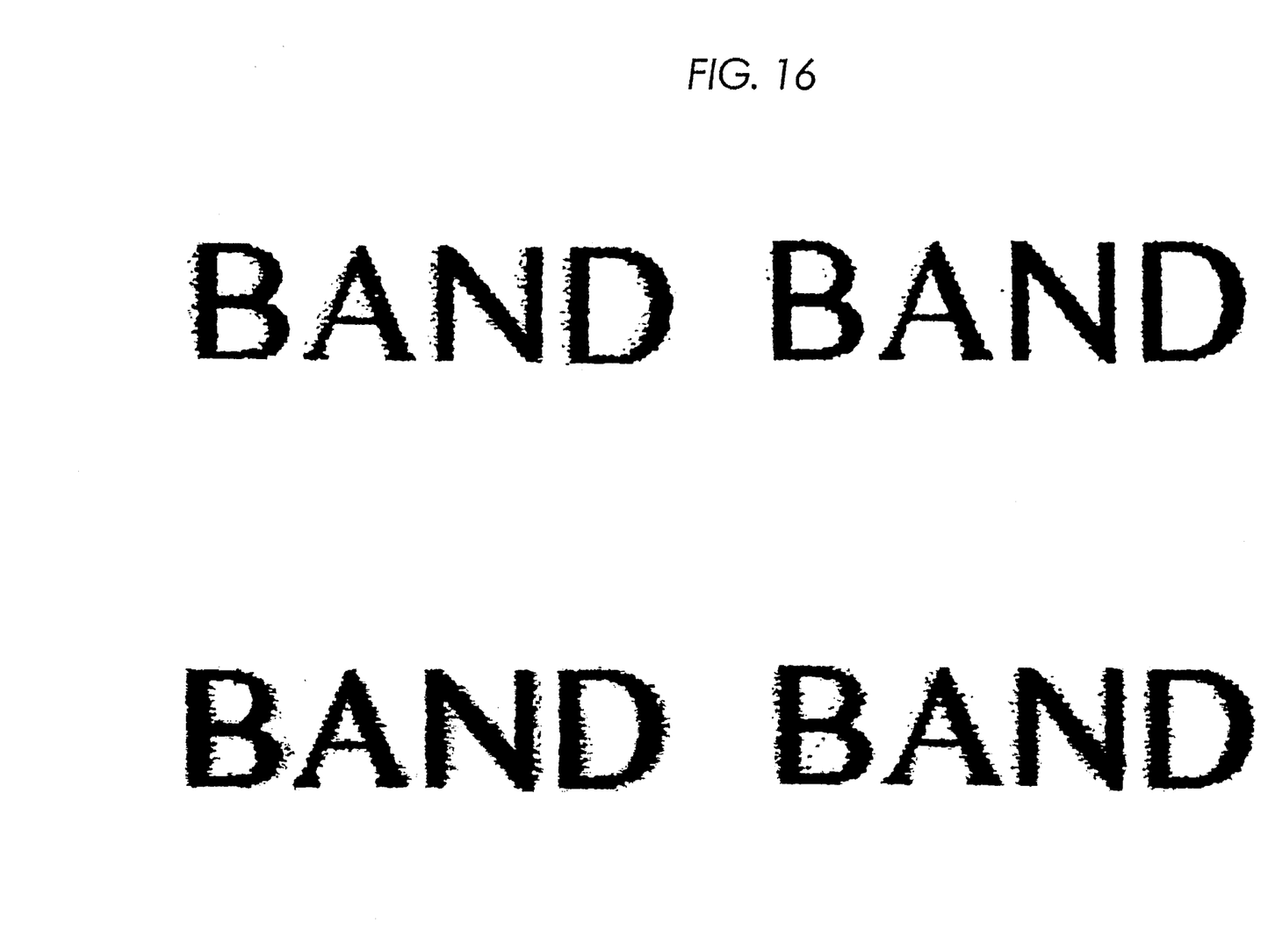
FIG. 16 is a photographic reproduction of four greatly enlarged photographic records of a word printed on an inkjet printer, contrasting performance of the print mode of the invention with three conventional print modes.

FIG. 16, upper right-hand view, is a resulting image printed on an inkjet printer—unmodified except for incorporation of this algorithm into the operating program. For comparison the remaining three views exhibit the same subject matter printed on the same printer but conventionally: unidirectional single-pass images, respectively right-to-left and left-to-right scans, in the two left-hand views; and a bidirectional two-pass image in the lower right-hand view.

Thus the upper and lower left-hand images exhibit relatively severe blur at, respectively, the left and right sides of each vertical stroke; and that same severe degree of blur is seen at both sides of each stroke in the lower right-hand image. The upper right-hand image, by comparison is relatively much clearer or cleaner, at both sides of each vertical stroke.

These samples were made using an inkjet printer of the Hewlett Packard Company, specifically a DeskJet Model 550c. The microprocessor in the DeskJet 500 family of printers has enough computing power to implement bidirectional, two-pass print modes described in this document; accordingly application of this invention is, at least in principle, not limited to new products but also available on a software-upgrade basis (e. g., with Windows® by merely transmitting a suitable printer driver to the printer) for use in any printers of that model family, or other model family with comparable or greater computing power.

The foregoing disclosure is intended to be merely exemplary, and not to limit the scope of the invention—which is to be found by reference to the appended claims.

I claim:

1. A method of printing images as an array of many pixels, using a bidirectionally scanning inkjet pen; said method comprising the steps of:

while scanning the pen in a first direction, printing a leading edge, with respect to said first direction, of an image element and refraining from printing a trailing edge, with respect to said first direction, of said element;

while scanning the pen in a second direction opposite to the first direction, printing a leading edge, with respect to said second direction, of said image element and refraining from printing a trailing edge, with respect to said second direction, of said element;

while scanning the pen in the first direction, also printing at least one interior portion of said image element;

wherein the interior portion is separated from the leading edge printed while scanning the pen in the first direction, and is substantially adjacent to the leading edge printed while scanning the pen in the second direction; and further comprising the step of, while scanning the pen in the second direction, also printing at least one additional interior portion of said image element;

said additional interior portion being separated from the leading edge printed while scanning the pen in the second direction, and substantially adjacent to the leading edge printed while scanning the pen in the first direction.

2. The method of claim 1, further comprising the step of:

before printing either leading edge, analyzing the image element to determine which pixel columns are leading edges with respect to each scanning direction, which pixel columns are said first-mentioned interior portion, and which pixel columns are said additional interior portion.

3. A method of printing images as an array of many pixels, using a bidirectionally scanning inkjet pen; said method comprising the steps of:

while scanning the pen in a first direction, printing a leading edge, with respect to said first direction, of an image element and refraining from printing a trailing edge, with respect to said first direction, of said element;

while scanning the pen in a second direction opposite to the first direction, printing a leading edge, with respect to said second direction, of said image element and refraining from printing a trailing edge, with respect to said second direction, of said element;

while scanning the pen in the first direction, also printing at least one interior portion of said image element;

wherein the interior portion is separated from the leading edge printed while scanning the pen in the first direction, and is substantially adjacent to the leading edge printed while scanning the pen in the second direction; and further comprising the step of, while scanning the pen in the second direction, also printing at least one additional interior portion of said image element;

said additional interior portion being separated from the leading edge printed while scanning the pen in the second direction, and substantially adjacent to the leading edge printed while scanning the pen in the first direction;

before printing either leading edge, analyzing the image element to determine which pixel columns are leading edges with respect to each scanning direction, which pixel columns are said first-mentioned interior portion, and which pixel columns are said additional interior portion;

before printing either leading edge, analyzing the image element to determine which pixel rows are top edge, bottom edge, and vertically middle segment of the image element;

associating the top and bottom edge rows, above and below said additional interior portion, with the leading edge and first-mentioned interior portion printed in said first direction, for printing during scanning in said first direction; and associating the top and bottom edge rows, above and below said first-mentioned interior portion, with the leading edge and additional interior portion printed in said second direction, for printing during scanning in said second direction.

4. The method of claim 3, wherein said analyzing steps further comprise:

selecting the number of pixel columns to serve as leading edges in such a way as to optimize print quality; and selecting the number of pixel rows to serve as top and bottom edges in such a way as to optimize print quality.

5. The method of claim 1, further comprising the step of:

while scanning the pen in at least one of the two directions, also printing at least one overlap portion;

said overlap portion being positioned to merge said substantially adjacent interior portions and edges, in event of interscan misalignment that tends to separate an interior portion printed while scanning in either direction from a leading edge that is substantially adjacent to said interior portion and is printed while scanning in an opposite direction.

6. A method of printing images as an array of many pixels, using a bidirectionally scanning inkjet pen; said method comprising the steps of:

while scanning the pen in a first direction, printing a leading edge, with respect to said first direction, of an image element and refraining from printing a trailing edge, with respect to said first direction, of said element;

while scanning the pen in a second direction opposite to the first direction, printing a leading edge, with respect to said second direction, of said image element and refraining from printing a trailing edge, with respect to said second direction, of said element;

while scanning the pen in the first direction, also printing at least one interior portion of said image element;

while scanning the pen in at least one of the two directions, also printing at least one overlap portion;

said interior portion being substantially adjacent to said leading edge printed while scanning the pen in the second direction; and said overlap portion being positioned to merge said interior portion with said leading edge printed while scanning the pen in the second direction, in event of misalignment that tends to separate the interior portion from said substantially adjacent leading edge printed while scanning in the second direction.

7. A method of printing images as an array of many pixels, using a bidirectionally scanning inkjet pen; said method comprising the steps of:

while scanning the pen in a first direction, printing a leading edge, with respect to said first direction, of an image element and refraining from printing a trailing edge, with respect to said first direction, of said element;

while scanning the pen in a second direction opposite to the first direction, printing a leading edge, with respect to said second direction, of said image element and refraining from printing a trailing edge, with respect to said second direction, of said element;

while scanning the pen in the first direction, also printing at least one interior portion of said image element; and before printing either leading edge, analyzing the image element to determine which pixel columns are to be treated as leading edges with respect to each scanning direction, and which pixel columns are to be treated as said interior portion;

wherein said analyzing step comprises selecting a number of pixel columns which will be treated as leading edges to optimize print quality.

8. A method of printing images as an array of many pixels, using a bidirectionally scanning inkjet pen; said method comprising the steps of:

while scanning the pen in a first direction, printing a leading edge, with respect to said first direction, of an image element and refraining from printing a trailing edge, with respect to said first direction, of said element;

while scanning the pen in a second direction opposite to the first direction, printing a leading edge, with respect to said second direction, of said image element and refraining from printing a trailing edge, with respect to said second direction, of said element;

while scanning the pen in the first direction, also printing at least one interior portion of said image element; and before printing either leading edge, analyzing the image element to determine which pixel columns will be treated as leading edges with respect to each scanning direction, and which pixel columns will be treated as said interior portion;

wherein said analyzing step comprises selecting a number of pixel columns which will be treated as leading edges to obtain an optimum trade-off between adverse effects of runners and adverse effects of surface tension.

9. A method of printing images as an array of many pixels, using a bidirectionally scanning inkjet pen; said method comprising the steps of:

while scanning the pen in a first direction, printing the leading edge, with respect to said first direction, of an image element and refraining from printing the trailing edge, with respect to said first direction, of said element;

while scanning the pen in a second direction opposite to the first direction, printing the leading edge, with respect to said second direction, of said image element and refraining from printing the trailing edge, with respect to said second direction, of said element;

before printing an image, analyzing the entire image to determine which pixel columns will be treated as leading edges of image elements within the image, with respect to each scanning direction; and said analyzing step comprises selecting the number of pixel columns which will be treated as leading edges to optimize print quality.

10. A method of printing images as an array of many pixels, using a bidirectionally scanning inkjet pen; said method comprising the steps of:

while scanning the pen in a first direction, printing the leading edge, with respect to said first direction, of an image element and refraining from printing the trailing edge, with respect to said first direction, of said element;

while scanning the pen in a second direction opposite to the first direction, printing the leading edge, with respect to said second direction, of said image element and refraining from printing the trailing edge, with respect to said second direction, of said element;

before printing an image, analyzing the entire image to determine which pixel columns will be treated as leading edges of image elements within the image, with respect to each scanning direction; and said analyzing step comprises selecting the number of pixel columns which will be treated as leading edges to obtain an optimum tradeoff between adverse effects of runners and adverse effects of surface tension.

11. A method of printing images as an array of many pixels, using a bidirectionally scanning inkjet pen; said method comprising the steps of:

analyzing an image element to determine which pixel rows should be treated as top edge, bottom edge, and vertically middle part, respectively, of the element; and to determine which pixel columns should be treated as left and right edges, and first and second interior portions, respectively, of the element;

said analyzing step comprising selecting numbers of rows to treat as top and bottom edges so as to optimize image quality; and while scanning the pen in a first one of its bidirectionally scanning directions, printing the top and bottom edges above and below the first interior portion;

while scanning the pen in a second direction that is opposite to the first direction, printing the top and bottom edges above and below the second interior portion.

12. The method of claim 11, wherein:

said analyzing step comprises selecting the number of pixel columns which will be treated as leading edges to obtain an optimum tradeoff between adverse effects of runners and adverse effects of surface tension.

* * * * *